March 5, 1963 F. SÜBERKRÜB 3,079,720
OTTER BOARDS FOR TRAWL NETS
Filed June 24, 1959
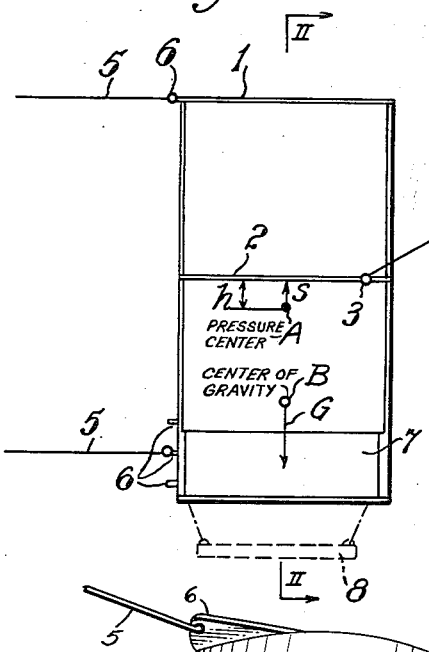
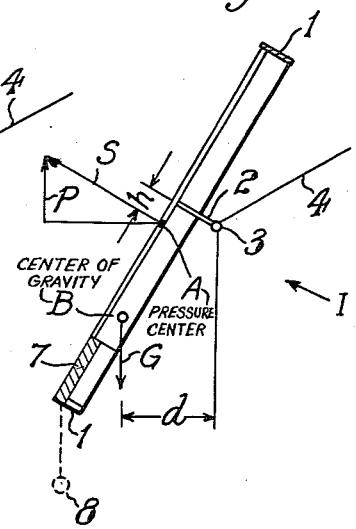
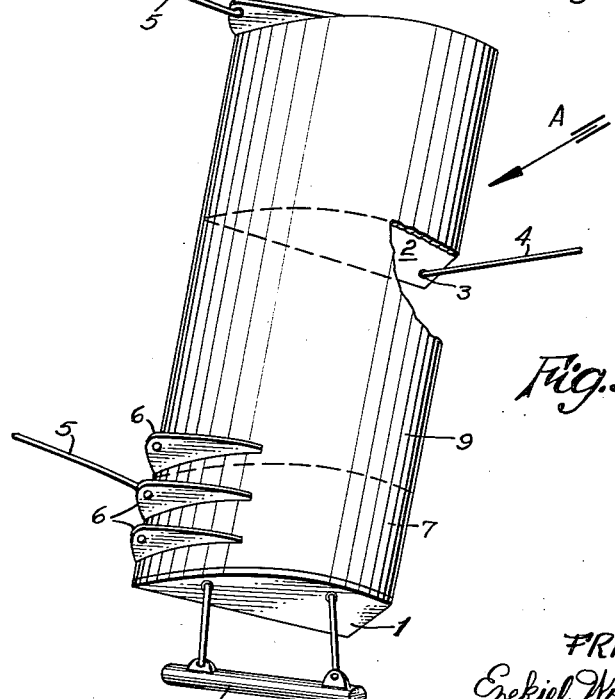
INVENTOR
FRANZ SÜBERKRÜB
Ezekiel Wolf, Wolf & Greenfield
Attorneys

United States Patent Office 3,079,720
Patented Mar. 5, 1963

3,079,720
OTTER BOARDS FOR TRAWL NETS
Franz Süberkrüb, CVI Chilehaus, Hamburg, Germany
Filed June 24, 1959, Ser. No. 822,593
Claims priority, application Germany Jan. 22, 1959
6 Claims. (Cl. 43—9)

This invention relates to otter boards for laterally keeping open trawl nets.

The otter boards used for bed trawling for the purposes of laterally keeping open the nets are fastened on the trawl line and the net brace lines and are in addition provided with ballast in such manner that they shear downward and during trawling are pressed firmly onto the bed.

When these boards are to be used for pelagic fishing, during which they do not touch the bed, a shallower depth adustment can be obtained only by hauling in the trawl lines, which is a very slow and complicated process.

It is an object of the present invention to provide an otter board which is provided with ballast at the bottom, for the purposes of laterally keeping open trawl nets and which is suitable both for fishing in variable depths of water (pleagic fishing) and for fishing on the water bed (bed trawling).

According to the present invention, this problem is solved by arranging the tractive force of the trawl line to act above the pressure centre of the shearing force. With such a board, when the trawling speed and hence the shearing force are increased, the total pressure acting at the pressure centre point increases, so that the board is pressed with the bottom edge in the outward direction and assumes an inclined position such that it shears upward. If the speed and hence the pressure is reduced, the board straightens itself again to a greater or lesser degree in consequence of the ballast situated at the bottom, and sinks lower with the net.

The vertical depth of the net can be varied by relatively small changes of the trawling speed. In order to obtain a depth adjustment in the upward or downward direction advantageously adapted to practical requirements, the design values determining the vertical dynamic buoyancy, comprising the magnitude of the weight of the board including the ballast, the distance between the weight centre of gravity and pressure centre of the shearing force and the distance between the point of action of the trawl line and the pressure centre, are so chosen that the vertical dynamic buoyancy for a given trawling speed is equal to the weight of the otter board. This gives the advantage that the otter boards hold the net at the water depths determined by the length of the trawl line, without any difficulty at the predetermined trawling speed. Changes in the required depth of the net in the water can then be achieved in a short time without altering the trawl line length simply by varying the trawl speed.

The ballast may advantageously be variable, so that it is possible to adapt the above-indicated equilibrium condition to the speeds which are preselected for the respective catch conditions.

In order to avoid the falling over of the otter board at reduced speed and on bed contact, it is advantageous according to a feature of the invention to dispose the ballast or part thereof in such manner that it hangs freely under the board. When this freely hanging ballast touches the bed, the part of the ballast acting on the board is reduced so that the board turns with the lower edge outward, assuming an inclined position such that it cannot fall over in the outward direction. Another advantage of this freely suspended ballast is that the catch gear can be held at a determined distance of, for example, 1 metre above the bed (bed trawling), so that damage to the net in the case of a stony bed is avoided.

Otter boards hitherto made consist essentially of wood. However, this is hygroscopic and accordingly the weight of the board varies considerably in the water, according to the duration of fishing. Accordingly wooden otter boards are unsuitable since the important feature is the weight of the otter board if a favourable mode of operation is to be achieved. According to a further feature of the invention, therefore, the otter board consists of non-hygroscopic material e.g. metal or plastic, so that its weight remains constant.

The invention will now be more fully described with reference to the accompanying drawings which illustrate diagrammatically and by way of example, one embodiment of otter board in accordance therewith and in which:

FIGURE 1 is a view of the otter board seen in the direction of the arrow I of FIG. 2;

FIGURE 2 is a section on the line II—II of FIGURE 1; and

FIGURE 3 is a perspective view of the otter board with a portion cut away to better show the attachment of the trawl line.

As is apparent from FIGURE 3, the otter board is arched in the direction of flow in the manner of an aerofoil. Edge strips 1 are provided at the upper and lower edges at a right angle towards the inside of the arching. The edge strips 1 serve for stiffening purposes and also to increase the shearing force since they prevent flow around these edges. At a distance $h$ above the point of action, or pressure centre, A of the shearing force S a bridge 2 is provided which has a hole 3 at the front end for the attachment of the trawl line 4.

The net brace lines 5 are fastened on the rear edge of the board on bridges 6. Near the bottom edge of the board a plurality of these bridges 6 are provided for fastening the net brace lines, in order to align the resultant tractive form of the net brace lines as far as possible over the height of the bridge 2.

A ballast 7 which may be variable is provided at the bottom edge of the board. As a result of the ballast 7 the centre of gravity B of the board is shifted to the lower part. Its horizontal distance $d$ from the point 3 is the lever arm of the weight G of the board acting at the centre of gravity B.

The magnitude of the shearing force S depends on the size and shape of the board and the square of the trawl speed. Its vertical component P is equal to the dynamic buoyancy. If this dynamic buoyancy P is made equal to the weight of the board, G, and the shearing force calculated on the basis of the trawl speed at any given time, the inclination of the board to the vertical is thus fixed and from the equation of moments $$S \cdot h = G \cdot d$$

$h$ can be determined. Nets equipped with such boards keep at the predetermined trawl speed in the middle water depth determined by the length of the trawl lines and when there is a slight increase in the trawl speed are raised to a shallower depth by the boards or lowered to a greater depth when the speed is reduced.

As indicated by broken lines in FIGURES 1 and 2, an additional or alternative ballast 8 to the ballast 7 may be suspended from the bottom of the board so that the effective weight G of the board decreases as soon as the ballast touches the bottom. The centre of gravity B in these circumstances shifts upward, so that the lever arm $d$ becomes smaller and consequently the moment $S \cdot h$ varies the inclination of the board in such manner that it shears upward. The effect is thus achieved that the board can never sink completely to the bottom even at lower trawl speeds and hence a falling over through bed contact is avoided. The otter board is made of non-hygroscopic material such as metal or plastics. Many other modifications and other constructions are possible within the scope of the invention. In particular, the otter board may also have a different surface shape or a different profile.

I claim:

1. An otter board provided with ballast at the bottom for the purposes of laterally holding open trawl nets for fishing at an adjustable depth of water, said otter board having a pressure centre of the shearing force developed when said board is towed through said water, a trawl line, and means for attaching said trawl line to said board so that the tractive force applied to said board from said line acts above said pressure centre.

2. An otter board according to claim 1, characterised in that said board is arched like an aerofoil in the direction of flow of water about said board as said board is towed through the water.

3. An otter board according to claim 1, wherein the magnitude of the weight of the board including the ballast, the distance between the centre of gravity of said weight and said pressure centre of the shearing force and the distance between the point of action of the trawl line and the pressure centre of the shearing force are selected so that the vertical dynamic buoyancy at a given trawl speed is equal to said weight of the otter board.

4. An otter board according to claim 1, characterised in that said board consists of non-hygroscopic material.

5. An otter board according to claim 1, characterised in that at least a part of the ballast hangs beneath the board.

6. An otter board comprising, a board having a center of gravity and a first point where a shearing force effectively acts normal to said board as the latter is towed through water, said first point being above and ahead of said center of gravity when said board is being towed through water, a tow line, and means for coupling said tow line to said board so that the force exerted on said board when the later is towed by said line acts on said board through a second point thereon, said second point being above and ahead of said first point when said board is being towed through water.

References Cited in the file of this patent

UNITED STATES PATENTS

| | | |
|---|---|---|
| 2,504,091 | Scheel | Apr. 11, 1950 |
| 2,608,781 | Pierlot | Sept. 2, 1952 |
| 2,689,425 | De Veen | Sept. 21, 1954 |

FOREIGN PATENTS

| | | |
|---|---|---|
| 10,262 | Great Britain | 1911 |
| 311,758 | Great Britain | Dec. 12, 1929 |